United States Patent [19]

Bolze

[11] 4,437,885

[45] Mar. 20, 1984

[54] METHOD FOR THE PHYSICAL SEPARATION OF A METALLIC PHASE AND SCORIAE IN AN INDUCTION FURNACE

[75] Inventor: Georges Bolze, Paris, France

[73] Assignee: Compagnie Generale des Matieres Nucleaires (Cogema), Vellzy Villacoublay, France

[21] Appl. No.: 413,457

[22] Filed: Aug. 31, 1982

[30] Foreign Application Priority Data

Sep. 3, 1981 [FR] France ................................. 81 16783

[51] Int. Cl.³ .............................................. C22C 4/00
[52] U.S. Cl. ..................................... 75/10 R; 75/12
[58] Field of Search ....................................... 75/10-12

[56] References Cited

U.S. PATENT DOCUMENTS 3,775,091 11/1973 Clites .................................. 75/10 R Primary Examiner—Peter D. Rosenberg
Attorney, Agent, or Firm—Larson and Taylor

[57] ABSTRACT

The invention relates to a method for the separation in an induction furnace of a metallic phase and scoriae in a crucible 1 essentially transparent to an electromagnetic field. The method consists of subjecting materials in a first zone 14 to an electromagnetic field of frequency enabling the direct coupling of the inductor 10 with the scoriae, then in a second zone to an electromagnetic field of reduced frequency enabling, under the effect of the centripetal forces produced, the assembling of the metallic phase 28 in the axial region of the crucible.

18 Claims, 3 Drawing Figures

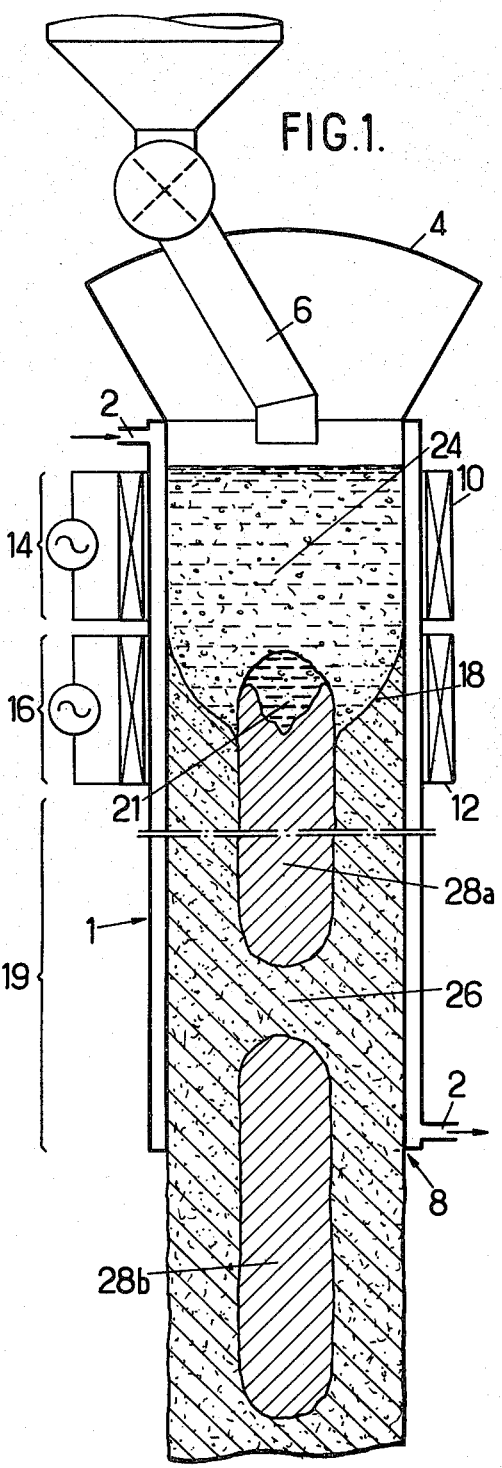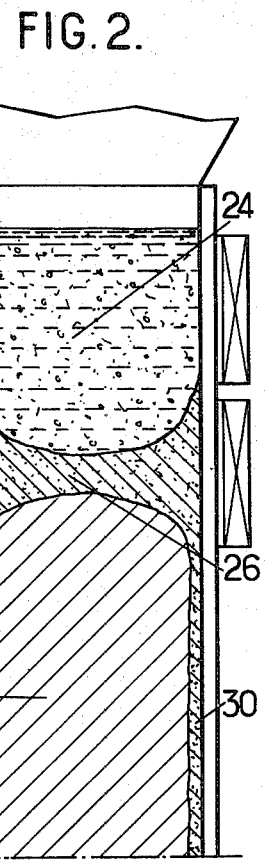

METHOD FOR THE PHYSICAL SEPARATION OF A METALLIC PHASE AND SCORIAE IN AN INDUCTION FURNACE

The invention relates to a method for the physical separation of a metallic phase and scoriae in an induction furnace.

By "metallic phase", must be understood any metal, alloy, intermetallic compound or any electrically conducting material generally in which induced currents can be produced, particularly by coupling with an inducing current, even at low frequency, which can be supplied by the induction coil of the induction furnace.

In the same way, by "scoriae" must be understood any material such as flux, fusing agents, slags and solvents, particularly those of the type used in electrometallurgy, which are essentially insulating at low temperature, but whose conductivity increases when the temperature rises, so that from a certain temperature, they may become the site of induced heating currents, by direct coupling with an induction current, as soon as the frequency of the magnetic field exceeds a certain threshold. Among these scoriae are included particularly those which certainly permit such coupling, when inducing currents of high frequency are applied, but which, when currents of frequencies below certain threshold values are applied, do not enable magnetic coupling, whatever the temperature.

The invention applies to the separation of any metallic phase and of any scoriae, whatever the origin thereof. It is consequently and by way of example applicable to the separation of phases such as obtained at the end of reactions of the pyrometallurgical or metallothermic scoria generating type, whether or not slag is present. In particular, the invention applies to the separation of phases obtained at the end of reactions aimed at extracting metals whose extreme affinity for oxygen is known, from corresponding extremely stable oxides, by reaction with another metal, with a still greater affinity for oxygen, whether or not flux, fusing agents, slags or materials are present, which can play the role of solvents with respect to further oxides formed in the course of this reaction.

Again by way of example, may be mentioned the separation of alloys of titanium and aluminum, on the one hand, and of the slag formed at the end of an aluminothermic reaction on the other hand, bringing into play titanium oxide and aluminum, in the presence of alkali or alkaline-earth fluorides, preferably calcium fluoride, which is adapted to play the role of solvent with respect to the alumina formed.

The invention is however not limited to the separation of metallic phases and of scoriae obtained at the end of this type of reaction. It applies also to any type of separation, for example that directed at the solubilization in a slag of oxidation products or the like, such as are formed in initially metallic parts in the course of their application in industrial processes. It may concern, for example, the purification reaction of zirconium, recovered after use, from nuclear reactor sheaths by contact with this slag-solvent of these oxidation products to form finally scroiae separable from the metal.

The invention hence applies to the separation of metallic phases and of scoria phases, such as are obtained at the end of any form of processing, whether it concerns chemical reactions, physical and/or chemical extractions etc.

It applies advantageously—without however being thereto limited—to the separation of metallic phases having high melting points, particularly higher than 1400° C. on the one hand, and of phases containing, for example, oxides and/or halides of alkali, alkaline-earth metals, aluminum or magnesium, etc., on the other hand.

Considerable literature exists describing these various types of reactions. The latter do not enter within the scope of the invention. Hence there is no need to dwell on this subject. It will nonetheless be noticed that when the phases of the type concerned have been obtained at high temperature and are in the molten state, their subsequent separation generally involves settling or coalescence of the metallic phase, if necessary under the action of a suitable magnetic field, to ensure separation between the two liquid phases, then cooling of the crucible to extract therefrom the then solidified phases. Such a separation process can obviously only be effected batch wise.

In the case of a processing method carried out continuously, it has been suggested also to resort to continuous casting techniques, particularly through the bottom of the crucible, both of the metallic phase and of the scoria phase. The latter type of separation does not occur without difficulty, taking into account the extremely high temperatures of the thus separated phases.

It is therefore an object of the invention to overcome these difficulties, more particularly to provide a method enabling effective separation of the metallic phases and of the scoriae phases, and of their respective solidifications still inside the crucible, this method being nonetheless capable of being made compatible with continuous processing techniques.

In particular, it is an object of the invention to provide a separating method such that, possibly, it also may constitute the last step of an overall method of metal or alloy processing, entirely carried out continuously. Finally an object of the invention is also, in continuous processing methods of a metallic phase, to resolve more easily than has been hitherto possible, the problem of fractionating the ingots obtained into separate parts having dimensions compatible with the conditions of their shipment or of their future use.

The separating method according to the invention, carried out in an induction furnace and in a crucible essentially transparent to electromagnetic fields maintained inside this induction furnace, is characterized in that the treated material is subjected:

in a first zone to an induction current of sufficiently high power and frequency to enable the direct coupling of this induction current with the material in this first zone, so as to maintain the scoriae in the molten state, then in a second zone, preferably adjacent to the preceding one, to an induction current of such power or frequency, or both at the same time, that direct coupling between the induction current and the scoriae is enabled no longer.

When the scoriae represent a considerable proportion by volume, particularly more than 10% by volume of the totality of the materials, the power and the frequency of the induction current in this second zone are adjusted so that said scoriae are herein also gradually brought to the solid state.

In the majority of cases the power and the frequency of the inductor current exerting its effects at the level of the first zone are preferably also adjusted so as to bring and/or to maintain the metallic phase in the molten state, within this first zone.

In a preferred embodiment of the method of the invention, relative movement of the materials is produced with respect to the abovesaid first and second zones whose relative positions are determined with relation to that of at least one inductor, preferably two separate inductors coacting with the crucible.

In the foregoing mention has been made, in order to facilitate the description—and mention will again often be made—of coupling or of non-coupling of the induction current or of the inductor with the scoriae (or the metallic phase) to express under the conditions which will then be contemplated, the ability or not of the inducing current to induce an electric current in said scoriae (or in the metallic phase).

In order to permit the couplings which have been discussed above, when the latter are desired, it is necessary to resort to a crucible transparent to electromagnetic fields, in other words a crucible being practically incapable of being itself "coupled" to the inductor or inductors.

In this regard recourse is advantageously had to a "cold" crucible constituted in known manner from a plurality of hollow elements cooled by fluid flow, particularly of water, and separated from one another by insulating elements, these hollow elements and these insulating parts constituting together a chamber adapted to receive the materials to be processed. Preferably also this cold crucible is of generally substantially cylindrical shape especially in the case of bottomless crucibles, such as are contemplated in the following. It is understood that the expression "substantially cylindrical shape" includes very slightly frustoconic shapes presenting a "taper" well known to specialists, this "taper" aiming to facilitate stripping, or in the case of a continuously operating method, the continuous extraction of the treated materials.

It is also understood that the expression "separation of the metallic phase and of the scoriae" implies simply the production of a metallic phase, homogeneous or continuous, distinct from the phase of the scoriae. Here it relates to a "phase separation" not necessarily including the operation consisting then in the "disengagement" if necessary of the two phases obtained from one another. It goes without saying also that the invention applies equally to the case of the separation of a relatively homogeneous metallic phase and of scoriae forming if necessary phases heterogeneous with one another.

In one of its first aspects the invention enables the realization of metallic phase processing in bottomless transparent crucibles, preferably vertical, generally associated with two inductors fixed with respect to the crucible. They then define two zones themselves fixed inside the crucible. The relative movement of the materials with respect to the inductor is then obtained by movement of the charge of the materials themselves inside the crucible.

More particularly the method according to the invention enables continuous feeding of such a crucible, itself contained inside the induction furnace, into its upper part with materials resulting, after contact and heating, in the formation of a metallic phase and of scoriae both essentially in the molten state in the abovesaid first zone, the scoriae being brought to solidify and to separate from the metallic phase in the second zone. Preferably, the metallic phase and the scoriae phase are then extracted through the end of the crucible, downstream of the direction of movement of the materials, particularly through the lower end of the crucible (a crucible which is then bottomless in the case of a vertical crucible).

In a preferred embodiment of the method according to the invention, the frequency of the induction current in the second zone is reduced to a value which does not permit any possibility of electromagnetic coupling with the scoriae, whatever the temperature may be.

In particular, and especially in the case of scoriae which are abundant relative to the amount of metallic phase processed, said frequency is even sufficiently reduced to subject the metallic phase itself to centripetal forces resulting in the selective gathering of the metallic phase before solidification, partially or totally in the axial region of the induction furnace (or of the inductor) in particular against the effect of gravity. The scoria tend consequently to gather close to the cold walls of the transparent crucible, and to soldify gradually from the walls thereby forming a solidification gradient, which tends, in the direction of the relative movement, to extend gradually towards the metallic phase from the walls of the crucible. The solidification of the scoriae is found to be all the more facilitated as they are not longer then "stirred" by the electromagnetic field.

If account is taken of the fact that the centripetal force which is exerted differentially on the metallic phase in the second zone tends to increase when the frequency applied in the second zone diminishes, it appears that it is possible to control the conditions of gathering of the metallic phase around the axis, progressively with the relative movement of this phase with respect to the inductor, to obtain finally a substantially continuous metallic phase which is soldified when its temperature reaches the solidification point. It thus becomes possible to extract from the second zone a part whose core is constituted by a metal ingot.

As a modification, it is also possible to adjust the conditions of cooling in the second zone, by reduction in the electrical power supplied to the second inductor.

The possibility of adjusting the frequency of the inducing magnetic field at the level of the first zone to a value which permits direct coupling to the scoriae themselves, also permits, and this more particularly when the invention is applied to a continuous processing method of a metallic phase, the control the feeding conditions of the furnace with reagents under conditions enabling the "prefractionation" subsequently into successive ingots of the metallic phase, which will accumulate in the second zone inside a solidified mass of scoriae. The separation of the ingots from one another is then easy. To this end, it is possible, according to a preferred embodiment of the invention, to limit the continuous feeding of the crucible with suitable materials intermittently, to only the elements which will subsequently be adapted to form scoriae or slags.

It is then possible to obtain, on emerging from the second zone and more particularly from the lower part of the furnace, solidified elongated parts, comprising at successive intervals parts consisting, of scoriae throughout their cross-section. In fact, in the first zone, at the time of this process there is formed a "liquid intermediate plug", then formed from scoriae alone, then in the molten state by reason of their electromagnetic coupling with the inductor, this "intermediate plug" being then "solidified" at the time of its passage through the abovesaid second zone. It is then easy at the outlet of the furnace to cause the separation of the metal ingots from one another at the level of these "solidified plugs". By reason of their fragility the latter may be broken by simple impact. This technique enables consequently "flying blow" operations in use in certain prior continuous ingot manufacturing methods to be avoided, for fragmenting them (cutting up by means of cutting devices then made fast with one of the parts of the piece to be cut up).

Other features of the invention will also appear in the course of the description which follows of installations and preferred embodiments of the method according to the invention, with the aid of the drawings in which:

FIG. 1 is a schematic diagram in vertical section of a bottomless cold crucible, associated with two inductors of an induction furnace, the installation being designed to permit continuous processing of metallic phases;

FIG. 2 is a schematic diagram aimed at explaining the phenomena of solid-solid or solid-liquid phase separation which can take place in the crucible, in a modification of the method according to the invention;

Figure 3:
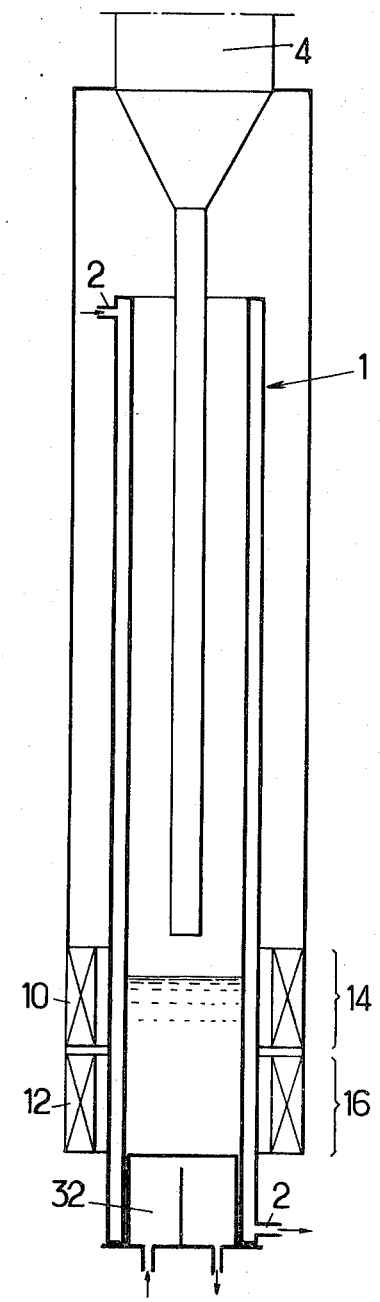
FIG. 3 is a schematic diagram of a modified installation, in which the relative movements may be produced by the displacement of the inductors relative to the crucible containing the material to be treated, or vice versa.

If reference is made to FIG. 1 and if the elements more particularly concerned by the invention are left out of account, it is observed that this installation comprises a "cold" crucible 1 capped by a supply vessel 4 in which a controlled atmosphere can be ensured by means conventional in themselves (not shown). One or several devices 6 for supply, observation and taking temperature etc., communicate in manner known in itself with this supply vessel. The cold crucible, here essentially of cylindrical shape, is kept in position by means not shown.

This essentially vertical crucible is provided with a system (also not shown) having the purpose, as the case may be, either of supporting, or of extracting a solidified ingot close to its lower end or open bottom 8.

In order to permit the practising of the method according to the invention, this crucible cooperates with at least one inductor, preferably two inductors 10 and 12, separate in the embodiment shown, associated with electrical supplies of separate frequencies and respectively surrounding two successive zones 14 and 16 of this crucible.

In accordance with the invention, the relative movement of the materials introduced into this crucible is produced, through the first zone 14, in which they are subjected to the action of an induction current of sufficiently high power and frequency for the materials to be reactable or fusible and give rise, in this first zone, to the formation on the one hand, of a metallic phase and on the other hand, of a liquid scoriae phase. To this end, the frequency of the induction current of the inductor 10 is adjusted to a value which, at the temperature maintained in this zone, enables coupling between the inductor 10 and the molten scoriae themselves.

On the contrary, the materials entering the second zone 16, downstream of the first zone 14, are here subjected to the action of an induction current of sufficiently reduced power and frequency for the possibility of direct coupling between the inductor 12 and the molten scoriae to be interrupted. In addition the frequency and the power of the induction current are adjusted so as to permit the progressive cooling of the materials passing into this second zone, the latter being particularly of sufficient length, so that at its outlet, the scoriae have essentially reverted entirely to the solid state. As has been indicated above, the frequency of the induction current applied to this zone is also sufficiently reduced so that, on the one hand, there is no longer a possibility of coupling between the inductor and the scoriae, whatever their temperature and, on the other hand, that the centripetal forces applied differentially to the scoriae and to the metallic phase become, as regards the latter, preponderant with respect to gravity.

There have been shown very diagrammatically, purely for purposes of explanation, the nature of the presumed phenomena which occur in said second zone. Although in the first zone 14 a vigorous stirring of the treated materials is observed, and consequently keeping the metallic phase and the scoriae in the state of mutual dispersion, it is observed, when these materials enter into the second zone 16, that under the effect of the increased centripetal forces induced by a current of reduced frequency, the metallic phase tends to gather in the axial part of said zone. At the same time there is formed in the scoriae phase a temperature gradient resulting in gradual solidification from the walls of the crucible, the solidified phase tending to extend towards the metal ingot in the course of formation in this zone, progressively with the movement of the charge downwards, as shown diagrammatically by the line 18, which symbolizes the liquid-solid front in the scoriae.

The power delivered in the inductor 16 enables control of the solidification conditions of the metallic phase 28a whose still liquid part, shown diagrammatically at 21, is still coupled with the inductor. The materials shown in FIG. 1 corresponds to a metallic phase having a higher melting point than the slag. Preferably too, the metal gathering around the axis is also entirely solidified, at the exit from said second zone. It may not always be so, especially for metals which have a lower melting point than that of the scoriae, in which the case the metal still liquid then finds itself nonetheless surrounded by a solid scoria phase and contained in the latter. As shown, the crucible extends preferably beyond the second zone, in the direction of movement of the materials, thus forming an additional cooling zone for the whole of the materials, then preferably completely solidified.

Such a device hence enables continuous material processing, if care is taken to ensure, through the supply device 6, the addition of different constituents in the appropriate proportions for the formation of said molten metallic phase and of said molten scoriae in the zone 14 and then, after their respective solidifications in the zone 16, the progressive and continuous extraction of the composite solid part formed by these two phases from the lower part 8 of the furnace, by means of outer or support means (not shown).

In the foregoing it has been assumed that the scoriae are in relatively large proportion by volume with respect to the whole of the treated materials; such is particularly the case when this metallic phase and thee scoriae are the result of a pyrothermic reaction or aluminothermy, for manufacturing, for example, an alloy of titanium and aluminum by the reaction of titanium oxide with aluminum, preferably in the presence of a material capable of acting as common solvent both for the reducing metal and the oxide formed in the course of the reaction.

It goes without saying that it is within the scope of the specialist to adjust under these conditions the proportion by weight of the reagents applied, the feed rates of the furnace with these reagents. It always depends on the specialist to adjust the electrical power supplied to the two successive induction coils as well as the frequencies aimed at ensuring the phenomena which have been indicated above also taking into account the dimensions of said zones (height and diameter particularly). As regards more especially the scoriae, it is known—or it is possible to determine—the temperature and the minimum frequency-threshold at a given temperature from which coupling of the inductor with the scoriae becomes possible, particularly with respect to the given dimensions of the crucible. At a given temperature the frequency-thresholds in one type of scoriae are in general all the higher as the diameter of the crucible is smaller. It is especially indicated below, if only to provide an indication of the parameters which are to be taken into consideration, that at a temperature of 1800° C., it becomes possible to form induced currents in molten calcium chloride under the action of a frequency higher than 3 mghz when the diameter of the crucible is of the order of 75 mm, and higher than 800 Khz when this diameter is of the order of 200 mm.

In the foregoing the preferred case has been evoked in which the two inductors 10 and 12 are supplied with induction currents of different frequencies, particularly high frequency in the inductor coacting with the first zone and medium or low frequency in the inductor coacting with the second zone.

Of course it is also possible to modify other parameters to obtain similar effects. For example the inductor 12 may be supplied with a current of the same frequency as that of the current coacting with the first zone, however at a lower electrical power, insufficient to ensure the maintainance in the second zone of the temperature existing in the first zone. The resulting cooling then has the effect of suppressing the possibility of coupling previously existing between the inductor 12 and the scoriae subject to a temperature reduction, consequent also on an interruption of stirring, facilitating their gradual solidification from the walls of the crucible to form a gradient such as that mentioned above.

In the foregoing, the relative motion of the materials with respect to the inductors was obtained by movement of the materials themselves, particularly from the top downwards in the first and second fixed zones co-acting themselves with the fixed inductors. Of course, the invention is not limited to this case.

In FIG. 3 is shown a modification of an installation in which the relative movement of the materials with respect to the inductors is obtained this time by movement of the inductors themselves and with them of the first and second zones such as defined above, particularly from the bottom to the top. The elements that the device shown possess in common with that of FIG. 1 are denoted by the same reference numerals. The installation shown differs essentially in that its bottom is this time closed by a removable bottom plate 32, also cooled by water circulation, the upper part of the crucible communicating as in the previous case with a supply vessel in which the atmosphere can be controlled. The induction coils 10 and 12, initially close to the bottom plate 32, are raised in controlled manner from below towards the top of the cold crucible, progressively and in accordance with the feeding of the crucible with the materials to be processed.

In this case also, it is possible to carry out the different operations contemplated with respect to the installation of FIG. 1. When the raising operation of the induction coils is terminated and the shaped part occupies almost the whole of the length of the crucible shown, the removable bottom plate 32 can then be withdrawn and the part extracted by means of a conventional extractor tool.

Another particularly interesting result that may be achieved by the invention consists, as has already been indicated above, in the possibility of "prefractionating" the solidified metallic phase into successive ingots at the level of the zone 16. For this purpose, if one refers again to FIG. 1, it suffices to modify by intermittence the nature of the materials introduced into the upper part of the crucible, by means of the feed device 6.

By limiting these materials to components capable of giving rise only to the formation of scoriae, during their passage in the first zone 14, it becomes possible to form a "liquid intermediate plug" of scoriae. The latter is then converted into a "solidified" plug 26, at the time of its passage into the second zone. The return to a feed, in the upper part of the crucible, of material leading again to the formation, on the one hand, of a metallic phase and, on the other hand, of scoriae, leads to the formation, at the outlet of the second zone, of a further ingot 28a.

As is seen in FIG. 1, the solidified plug 26 then ensures the separation of the ingot 28a the formation of which is under way, from the previously formed ingot 28b. At the outlet of the furnace, the ingots 28a and 28b may be easily separated by simple impact at the level of the "solidified plug" 26 of scoriae.

The latter result is also particularly interesting on the ocassion of processing metals or alloys in processes only normally involving the formation of a small proportion of slag, particularly in a proportion by volume less than 10%, even less than 5%, relative to the whole of the materials normally processed in the induction furnace.

The assocation of the crucible with two zones such as have been defined above enables, here again, the possibility of forming ingots 28 (FIG. 2) prefragmented by means of successive solidified plugs 26, under conditions similar to those which have been specified.

In such a case, the principal role of the inductor 10 remains, as in the preceding case, that of permitting the formation of the "liquid intermediate plugs" whose solidification at the outlet from the first zone will permit the formation of the above-mentioned intermediate plugs 26, and this more particularly when, under the conditions already mentioned, the materials introduced into the crucible, through the feed device 6, are limited to components only forming scoriae in the first zone.

In such a case, the effect resulting from the creation of centripetal forces in the second zone is less important, especially when the materials then introduced into the crucible will again be such that they result in the subsequent formation of a quite preponderant metallic phase, the possible scoriae formed being limited to the formation of a thin skin 30 (FIG. 2). In this case, gravity will be sufficient to ensure the accumulation of the metallic phase, to form the ingot 28 of solidified metallic phase. The introduction and the maintenance in the molten state of the metallic phase will then moreover only take place in the second zone, under the effect of a current of medium or low frequency, supplied by the inductor 12 coacting with the second zone.

The two inductors coacting with the two zones can again, as in the preceding case, be supplied simultaneously with currents having frequencies responding to the above indicated conditions. The energy dissipated in the first zone will then serve to effect at least one preheating of the materials introduced into the crucible and especially, when the materials introduced are intermittently limited to those forming only scoriae, to ensure the fusion of the latter.

On the contrary, the current of medium or low frequency, applied to the inductor coil 12 cooperating with the second zone, will normally be designed to achieve the fusion of the previously preheated metallic phase in the first zone, the supply of the field coil 12 being even interruptable when the materials undergoing melting in the first zone are exclusively constituted by scoria-forming materials, penetrate into the second zone.

Conversely, it is possible also to envisage the interruption of the supply of the induction coil 10 coacting with the first zone, when the materials initially introduced into the furnace lead to the formation essentially of a metallic phase and when the electrical energy dissipated in the second zone is sufficient to ensure the complete melting of these materials, including here the small amount of scoriae possibly produced, by contact alone with the molten metallic phase formed and then preponderant.

It results from the foregoing that it is possible also, in accordance with a particular embodiment of the invention, to alternate the electrical supplies of the induction coils 10 and 12, respectively associated with the first and the second zone, in conformity with the intermittent modifications of the constitutions of the materials introduced continuously into the crucible, the induction coil associated with the first zone being placed in operation with the materials then introduced into this zone are limited to those which are only intended to form scoriae and the induction coil coacting with the second zone being essentially placed in operation when the materials then present in this second zone consist essentially, under the effect of heating, of a metallic molten phase.

The field coils 10 and 12 may even then be superposed around a common region of the crucible, whereby the first and second zones are merged into a single region, these concepts only then having sense in relationship with that of the induction coils then supplied with electrical current. In this case, the materials processed in this region will then be subjected alternately to the electromagnetic field of high frequency supplied by the induction coil 10 (first zone), when the materials treated in the corresponding zone only result in the formation of scoriae, and the electromagnetic field supplied by the second induction coil 12 (second zone), when the materials entering into this same region result essentially in the formation of a metallic phase.

It is self evident that the supplies to the first induction coil and the second induction coil (whether the latter are superimposed or not) are advantageously coordinated with the modifications introduced, by intermittence, in the nature of the materials introduced into the crucible. The alternating electrical supplies of these inductors may either be controlled in relationship with the modifications in the supply of material, in particular servo-coupled to a device (not shown), adapted to modify, by intermittence, the nature of the materials introduced into the crucible, or result from these modifications, owing to the nature of the molten products passing respectively at the level of the first and second zone. In particular, the electrical supply of the inductor 12 may be interrupted, when the "liquified plug" of scoriae formed in the preceding zone enters into the second zone (case of nonmerged first and second zones).

It is however advantageous, in the case also where the scoria phase only represents a low proportion by volume with respect to the total of the materials processed in the crucible, to resort to the treatment in the two separate zones, respectively associated with the two inductors of the abovesaid type and to maintain the simultaneous electrical supplies of these two inductors. In addition, and if necessary, the amount of materials designed to form the scoriae is controlled so as to maintain permanently in the abovesaid first zone a body of liquified scoriae (the latter then floating on the metallic phase occuring in the molten state in the second zone, beneath the first zone). The materials introduced into the crucible and/or the metallic phase of higher density than that of the scoriae, which has emerged or which results from the conversion of these materials, are then preheated, even premelted in the first zone before reaching the second zone under the effect of gravity. The processing of the metallic phase is then completed, possibly by the bringing of the whole metallic phase in the molten state into the second zone.

This method modification is advantageously carried out semi-continuously. Periodically, the supply of materials subsequently providing the metallic phase is interrupted and a supply of materials forming scoriae is substituted for it at the time of their passage through the first zone, and the metallic phase ingot obtained is withdrawn through the base of the crucible, followed by the portion of the liquified plug which is caused to move from the first zone into the second zone, in which it is then solidified.

The supply of materials resulting in the metallic phase is then resumed again, to form a further metallic phase ingot separate from the previous one, under the conditions which have been indicated, as soon as the "liquid plug" of scoriae will have reformed in the first zone.

The description below of examples of practising the method according to the invention is only for the purpose of illustration and must be considered as having no limiting character.

EXAMPLE 1

Axial Separation of Phases

The installation applied was in accordance with that described with respect to FIG. 3. It comprised a crucible having a height of 1 m and an internal diameter of 100 mm. Its walls were formed from 22 tubular elements of copper and cooled by a water flow and defining the vessel of the crucible with as many insulating elements separating the tubular elements from one another. Two adjacent induction coils, each constituted by a coil about 10 cm high, defined around a portion of the crucible the first and second abovesaid zones. The induction coil 10 was supplied typically by a current of 850 Khz at a power of 40 kW and the induction coil 12 by a current of 10 Khz at a power of 15 kW.

This installation was used in a method for reducing titanium oxide with aluminum in the presence of calcium fluoride and calcium oxide. The proportions by weight used of these various reagents were the following:

TiO$_2$: 30%
Al: 23%
CaF$_2$: 22%
CaO: 25%

The reaction was started in the bottom of the crucible. After initiating the reaction in a manner known in itself, the temperature was brought and maintained in the "first zone" to a value of the order of 1800° C.

The rate of progressive supply of the crucible with a mixture of reagents in the same relative proportions by weight was adjusted so as to enable the movement of the two induction coils (from the bottom to the top) at the rate of about 1.2 cm per minute.

Both the alloy formed of titanium and aluminum, and the scoriae were in the molten state when they left the first zone and entered the second zone. They solidified in the second zone to form a composite cylinder comprising a coaxial metallic "carrot" surrounded by a phase of scoriae.

The metallic phase (60% by weight of titanium and 40% by weight of aluminum containing 0.3% oxygen) and the scoriae occured in proportions by volume of the order of ¼ to 1/5. This product was easily withdrawn from the crucible after removing the bottom plate 32.

EXAMPLE 2

Discontinuous Separation of Phases

The principle of this separation brought into play the two inductors of the insulation shown in FIG. 3 under the following conditions. The installation and the crucible having the characteristics already indicated in Example 1 were used. The operation consisted of carrying out melting of titanium scrap in the presence of a liquid calcium fluoride bath, in order to free it from a portion of the oxides contained in this scrap.

Into the bottom of the crucible was introduced calcium fluoride and, by means of the inductor 10 after starting the reaction in manner known in itself, the calcium fluoride was brought to fusion, by means of a current of 850 Khz at a power of 30 kW. The CaF$_2$ was then maintained in the liquid state. Then gradually the titanium scrap was introduced into the CaF$_2$ bath, which at the same time permitted the scrap to be isolated from the external atmosphere and a part of the oxides contained in this scrap to be already dissolved. The supply at the same time of titanium scrap and of CaF$_2$ was then continued, at the rate of 4% by weight with respect to the titanium scrap and, progressively with this supply, the movement of the inductors was produced under the conditions which have already been indicated.

At the same time, the inductor 12 was supplied with a current having a frequency of 10 Khz at a power of 100 kW. The magnetic field obtained enabled the melting and mixing of the metal to be carried out. The latter was then separated from the walls of the crucible by a thin skin of CaF$_2$. When the inductors reached a determined position, spaced from the bottom of the crucible, particularly in the vicinity of its upper part, their movement was interrupted, and the bottom plate 32 which closed the bottom of the crucible was removed. The supply of titanium scrap and of CaF$_2$ into the upper part of the crucible could then be maintained and the processing furthered continuously. The continuous extraction of the metallic ingot as it formed could then proceed, from the then open lower end of the crucible, in a manner known in itself, by means of an extractor (not shown). The CaF$_2$ skin surrounding the metallic part acted as lubricant and facilitated this extraction.

From time to time, the supply of titanium was interrupted and substituted by a supply of CaF$_2$. The high frequency current supplied by the inductor 10 then permitted the melting and maintenance in the molten state of the CaF$_2$ in the first zone. However when the molten CaF$_2$ entered the second zone, interruption of the magnetic coupling resulted in the cooling and consequently the solidification of the CaF$_2$ (the supply of the inductor 12 could then possibly be interrupted). When a sufficient portion of CaF$_2$ had thus been solidified, to form the "solidified plug" considered above, the titanium supply was resumed. Thus the CaF$_2$ gaps sought between several metallic ingots were obtained, and these ingots were then easily separated at the outlet of the crucible.

I claim:

1. Method for the separation in an induction furnace of a metallic phase and scoriae contained in a crucible essentially transparent to an electromagnetic field maintained within said induction furnace, which comprises subjecting the materials:
   in a first zone to an induction current of sufficiently high power and frequency to permit the direct coupling of this induction current with the materials in this first zone, so as to maintain the scoriae in the molten state,
   then, in a second zone, adjacent to the preceding one, to an induction current of such power or frequency, or both, that direct coupling between the induction current and the scoriae is no longer permitted.

2. Method according to claim 1, wherein relative moement of the materials is produced inside the crucible with respect to the abovesaid first zone and the abovesaid second zone, downstream of the preceding one, in the direction of said relative movement, the relative positions of these zones being determined relative to those of at least one inductor, co-acting with this crucible.

3. Method according to claim 1 or claim 2, wherein the frequency of the induction current in the abovesaid first zone is sufficiently high to be directly couplable with the scoriae themselves, at the temperature to which the scoriae are then subjected.

4. Method according to any one of claims 1 to 3, wherein the power and frequency of the induction current exerting its effects at the level of the first zone are adjusted so as to permit the maintenance in the molten state both of the metallic phase and the scoriae.

5. Method according to claim 1 or claim 2, wherein the power or frequency or both at the same time of the induction current exerting its effects at the level of the second zone are adjusted so as to permit the gradual return of said scoriae to the solid state, before their emergence from the second zone.

6. Method according to claim 5, wherein the frequency of the induction current in the second zone is reduced to a value no longer permitting electromagnetic coupling with the scoriae contained in this second zone, at the temperature to which they are brought back in said second zone.

7. Method according to claim 5, wherein the frequency of the induction current in the second zone is reduced to a value no longer permitting electromagnetic coupling with the scoriae contained in this second zone, whatever the temperature of these scoriae.

8. Method according to any one of claims 4, 5, 6 and 7, wherein the scoriae are in a proportion by volume of at least 10% with respect to the whole of the material treated in the same zone.

9. Method according to any one of claims 4, 5, 6 and 8, wherein in this second zone, said induction frequency is sufficiently reduced to subject the metal metallic phase to centripetal forces resulting in its selective concentration before solidification in the inner region, particularly the axial region of the induction furnace, by partial or practically total subtraction of the metallic phase from the action of gravity.

10. Method according to claim 9, wherein said power or frequency or both at the same time, are adjusted in said zone so that the metallic phase is also completely solidified at its exit from said second zone.

11. Method according to claim 10, wherein the crucible is essentially vertical, that it does not possess a bottom, that the crucible and the inductor or inductors are fixed, that the relative movement of the material with respect to the inductor is obtained by movement of the charge of materials inside the crucible, and that the separate phases are both extracted in the solidified state from the lower part of the furnace.

12. Method according to claim 11, wherein it is carried out continuously with continuous feeding of the furnace into its upper part with the materials resulting, after contact and heating, in the formation of a metallic phase and of a scoriae phase both essentially in the molten state, in the first zone.

13. Method according to any one of claims 1 to 3, wherein the proportion by volume of the scoriae contained in the materials normally treated in the induction furnace is low with respect to that of the metallic phase.

14. Method according to any one of claims 1 to 13, wherein, in the event of the abovesaid continuous feeding, the elements introduced into the furnace are limited, by intermittence, only to those which are subsequently adapted to form scoriae, to obtain at the exit from the lower part of the furnace solidified elongated parts comprising parts consisting, at successive intervals, of scoriae only, and in that said elongated continuously produced parts are fractionated, at the level of said parts, particularly by breakage outside the furnace.

15. Method according to claims 13 or 14, wherein the electrical supplies to the inductors 10 and 12, respectively associated with the first and with the second zone, are alternated, in conformity with the intermittent modification of the constitutions of the materials introduced continuously into the crucible, the inductor associated with the first zone being placed in operation when the materials then introduced into this zone are limited to those which are intended only to form scoriae and the inductor co-acting with the second zone being essentially placed in operation when the materials then present in this second zone result essentially, under the effect of the heating, in a metallic phase.

16. Method, according to claims 13, 14 or 15, wherein the separate inductors, normally associated with the abovesaid first and second zones, are superimposed on one another around a common region of the crucible, and in that the materials treated in this region are subjected alternately to the action of the inductor associated with the first zone and to the action of the inductor associated with the second zone, so that, in the first case, the materials created in the corresponding zone are limited to those which are only intended to form scoriae and, in the second case, the materials then treated in said region are adapted to supply both metallic phase and scoriae.

17. Method according to claims 12 or 14, wherein the power supplied to the inductor co-acting with the second zone is sufficient to bring or to maintain in the molten state the whole of the metallic phase which is treated therein.

18. Method according to any one of claims 1, wherein the crucible is an elongated crucible provided with a bottom and that the relative movement of the material and the two abovesaid zones and with respect to the one or more inductors is obtained, either by movement of the latter with respect to the crucible, from the lower part towards the upper part thereof, progressively and in relation with the supply of this crucible with materials to be treated, or by movement of the whole of the crucible with respect to the inductors.

* * * * *